United States Patent
Nagahara

(10) Patent No.: US 9,815,335 B2
(45) Date of Patent: **\*Nov. 14, 2017**

(54) PNEUMATIC TIRE

(71) Applicant: Sumitomo Rubber Industries Ltd., Kobe-shi, Hyogo (JP)

(72) Inventor: Naoya Nagahara, Kobe (JP)

(73) Assignee: SUMITOMO RUBBER INDUSTRIES LTD., Kobe-Shi, Hyogo (JP)

(*) Notice: Subject to any disclaimer, the term of this patent is extended or adjusted under 35 U.S.C. 154(b) by 299 days.

This patent is subject to a terminal disclaimer.

(21) Appl. No.: 14/622,008

(22) Filed: Feb. 13, 2015

(65) Prior Publication Data

US 2015/0231929 A1 Aug. 20, 2015

(30) Foreign Application Priority Data

Feb. 14, 2014 (JP) .................................. 2014-026859

(51) Int. Cl.
 *B60C 11/03* (2006.01)
 *B60C 11/04* (2006.01)

(52) U.S. Cl.
 CPC ........ *B60C 11/042* (2013.01); *B60C 11/0304* (2013.01); *B60C 2011/0353* (2013.01);
 (Continued)

(58) Field of Classification Search
 CPC ....... B60C 11/03; B60C 11/04; B60C 11/042; B60C 11/0304; B60C 11/0306; B60C 11/0309; B60C 2011/039; B60C 2011/0337; B60C 2011/0339; B60C 2011/0341; B60C 2011/0353;
 (Continued)

(56) References Cited

U.S. PATENT DOCUMENTS

2006/0137789 A1\* 6/2006 Shirouzu ............. B60C 11/0318
 152/209.8
2012/0118455 A1 5/2012 Hada
2013/0186532 A1 7/2013 Kujime

FOREIGN PATENT DOCUMENTS

JP 2012-218650 A 11/2012
JP 2013-151236 A 8/2013
WO WO 01/39995 A1 6/2001

OTHER PUBLICATIONS

Extended European Search Report, dated Nov. 25, 2015, for European Application No. 15153176.1.

\* cited by examiner

*Primary Examiner* — Eric Hug
(74) *Attorney, Agent, or Firm* — Birch, Stewart, Kolasch & Birch, LLP

(57) ABSTRACT

A pneumatic tire includes a tread portion provided with circumferentially extending main grooves and lateral grooves. The main grooves include an inboard shoulder main groove, an outboard shoulder main groove, an inboard center main groove and an outboard center main groove. The lateral grooves includes a plurality of first outboard shoulder lateral grooves each having an axially inner end positioned between the outboard shoulder main groove and the outboard center main groove, and a plurality of first inboard shoulder lateral grooves each having an axially inner end positioned between the inboard shoulder main groove and the inboard center main groove, wherein the number of the first inboard shoulder lateral grooves is greater than the number of the first outboard shoulder lateral grooves.

20 Claims, 6 Drawing Sheets

(52) U.S. Cl.
CPC ............... *B60C 2011/0358* (2013.01); *B60C 2011/0372* (2013.01); *B60C 2011/0381* (2013.01)

(58) Field of Classification Search
CPC ..... B60C 2011/0358; B60C 2011/0381; B60C 2011/0386; B60C 2011/0372; B60C 2011/0383; B60C 2011/0374
USPC ....... 152/209.1, 209.3, 209.8, 209.9, 209.16, 152/209.18, 900, 901
See application file for complete search history.

PNEUMATIC TIRE

BACKGROUND OF THE INVENTION

1. Field of the Invention

The present invention relates to a pneumatic tire, and in particular to a pneumatic tire that may exhibit an excellent steering stability.

2. Description of the Related Art

Japanese unexamined patent application publications Nos. 2012-218650 and 2013-151236 disclose a pneumatic tire including a tread portion having a designated installation direction to a four-wheeled vehicle. The tread portion is provided with a plurality of circumferentially extending main grooves having respective groove widths that are associated with one another.

Unfortunately, the pneumatic tire described above may not take into account the relationship between the number of inboard shoulder lateral grooves and the number of outboard shoulder lateral grooves. Accordingly, the pneumatic tire may exhibit undesirable steering stability.

SUMMARY OF THE INVENTION

The present invention has been worked in light of the above problems, and it is an object thereof to provide a pneumatic tire having an excellent steering stability. According to one aspect of the present invention, there is provided a pneumatic tire including a tread portion having a designated installation direction to a vehicle. The tread portion is provided with an inboard tread edge, an outboard tread edge, a plurality of circumferentially and continuously extending main grooves so as to form a plurality of land portions between the inboard tread edge and the outboard tread edge and a plurality of lateral grooves. The main grooves include an inboard shoulder main groove arranged proximate to the inboard tread edge, an outboard shoulder main groove arranged proximate to the outboard tread edge, an inboard center main groove arranged between the inboard shoulder main groove and a tire equator and an outboard center main groove arranged between the outboard shoulder main groove and the tire equator. The lateral grooves include a plurality of inboard shoulder lateral grooves extending axially inward from the inboard tread edge and a plurality of outboard shoulder lateral grooves extending axially inward from the outboard tread edge. The outboard shoulder lateral grooves include a plurality of first outboard shoulder lateral grooves each having an axially inner end positioned between the outboard shoulder main groove and the outboard center main groove, and a plurality of second outboard shoulder lateral grooves each having an axially inner end positioned between the outboard shoulder main groove and the outboard tread edge. The inboard shoulder lateral grooves include a plurality of first inboard shoulder lateral grooves each having an axially inner end positioned between the inboard shoulder main groove and the inboard center main groove, wherein the number of the first inboard shoulder lateral grooves is greater than the number of the first outboard shoulder lateral grooves.

In another aspect of the invention, the number of first inboard shoulder lateral grooves may be twice the number of first outboard shoulder lateral grooves.

In another aspect of the invention, the first outboard shoulder lateral grooves and the second outboard shoulder lateral grooves may be alternately arranged in a circumferential direction of the tire.

In another aspect of the invention, the first outboard shoulder lateral grooves may extend in parallel to the second outboard shoulder lateral grooves.

In another aspect of the invention, the outboard shoulder main groove may have a minimum groove width among the main grooves.

In another aspect of the invention, a plurality of center lateral grooves extending between the inboard center main groove and the outboard center main groove may be arranged.

In another aspect of the invention, each of the center lateral grooves may have a groove depth in a range of not more than 50% of a groove depth of the inboard center main groove.

In another aspect of the invention, the number of the center lateral groove may be the same as the number of the first outboard shoulder lateral groove.

In another aspect of the invention, an inboard middle lug groove extending axially outward from the inboard center main groove without reaching the inboard shoulder main groove may be arranged between the circumferentially adjacent first inboard shoulder lateral grooves.

In another aspect of the invention, an outboard middle lug groove extending axially outward from the outboard center main groove without reaching the outboard shoulder main groove may be arranged between the circumferentially adjacent first outboard shoulder lateral grooves.

DETAILED DESCRIPTION

Figure 1:
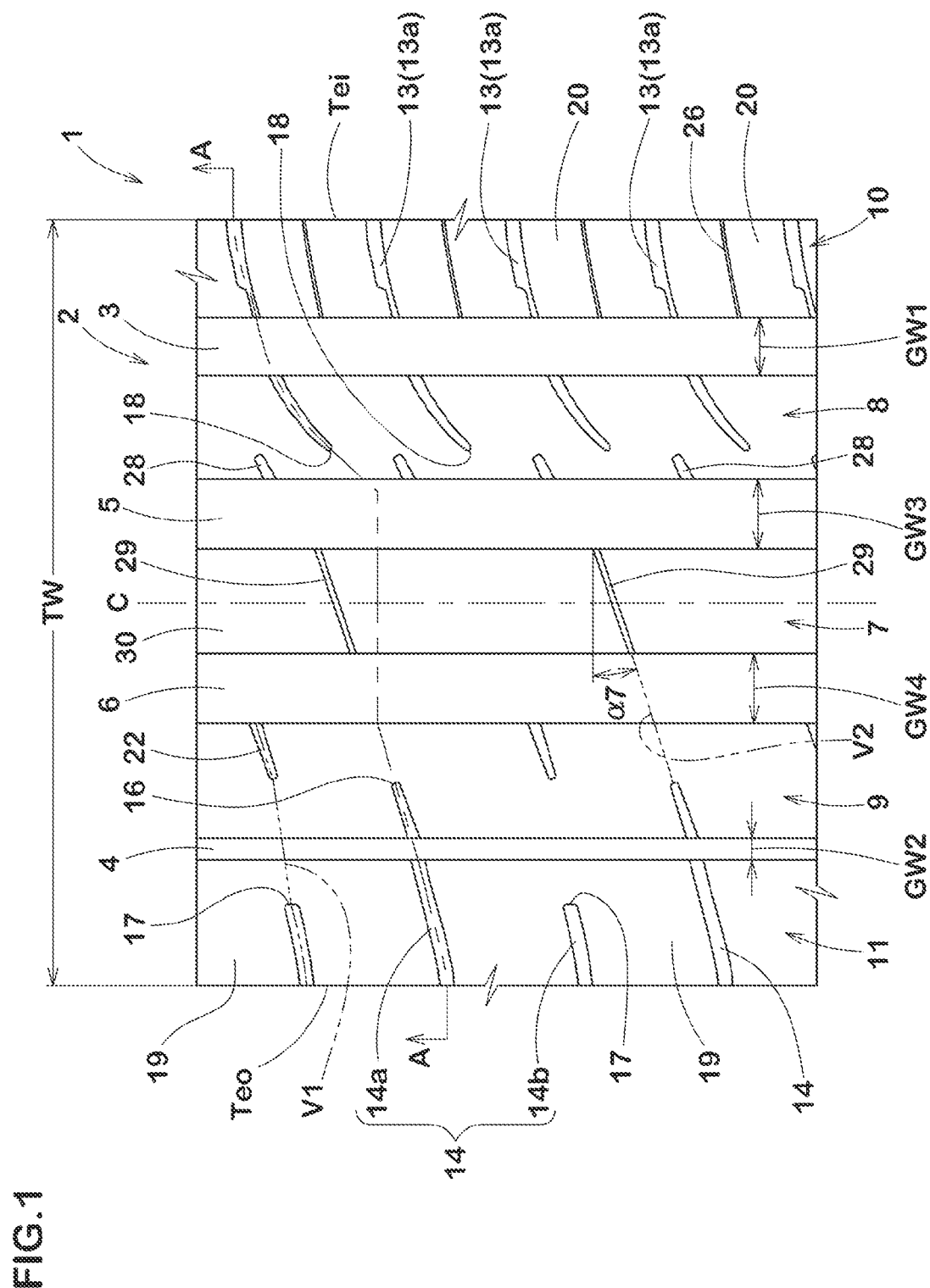
FIG. 1 is a development view of a tread portion of a pneumatic tire in accordance an embodiment of the present invention.

An embodiment of the present invention will be explained below with reference to the accompanying drawings. FIG. 1 illustrates a development view of a tread portion of a pneumatic tire 1 in accordance with an embodiment of the present invention, and FIG. 2 illustrates a cross sectional view of the tire 1 taken along a line A-A of FIG. 1.

Figure 2:
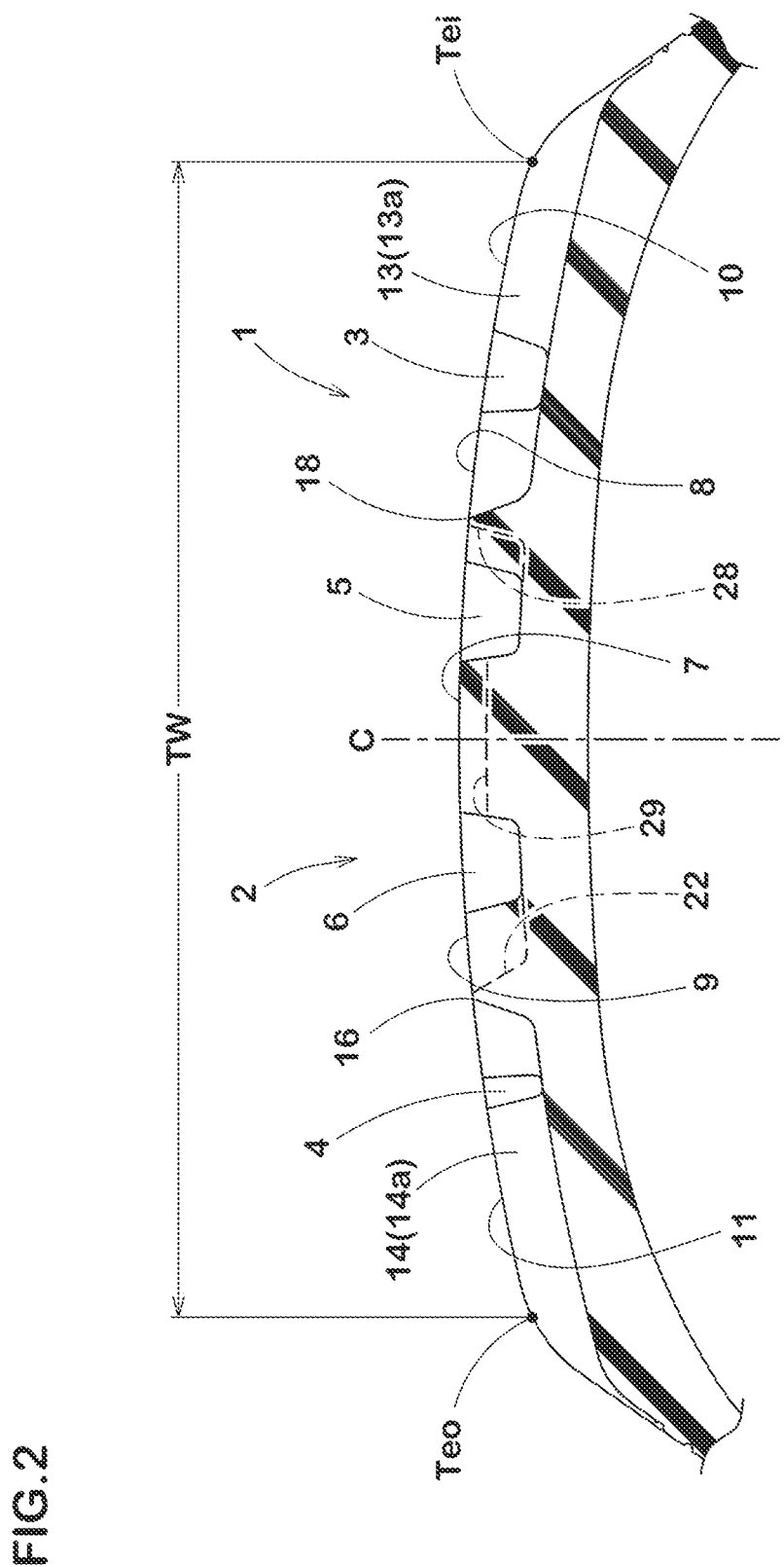
FIG. 2 is a cross sectional view of the tire taken along a line A-A of FIG. 1.

Referring to FIGS. 1 and 2, the pneumatic tire 1 in accordance with the present embodiment is embodied as a passenger car tire having an installation direction to a four-wheeled vehicle. The installation direction can be identified on a sidewall portion (not shown) of the tire 1 using a mark or characters.

The tread portion 2 includes an inboard tread edge Tei and an outboard tread edge Teo which define the inboard side edge and the outboard side edge of the tread portion 2 respectively, when the tire 1 is installed to the vehicle. A plurality of circumferentially and continuously extending main grooves are arranged between the inboard tread edge Tei and the outboard tread edge Teo to form a plurality of land portions.

In this embodiment, the main grooves include an inboard shoulder main groove 3 arranged proximate to the inboard tread edge Tei, an outboard shoulder main groove 4 arranged proximate to the outboard tread edge Teo, an inboard center main groove 5 arranged between the inboard shoulder main groove 3 and the tire equator C and an outboard center main groove 6 arranged between the outboard shoulder main groove 4 and the tire equator C.

In this embodiment, each of the main grooves 3 to 6 extends in a straight manner along the circumferential direction of the tire. Thus, the respective main grooves 3 to 6 may effectively expel the water from under the tread portion 2 backwardly. In another aspect of the embodiment, at least one main groove may be formed as a zigzag groove.

In the preferred embodiment, the outboard shoulder main groove 4 may have a groove width GW2 which is the smallest as compared to those of the other main grooves. Thus the outboard side of the tread portion 2 may have a higher land ratio, thereby improving steering stability of the tire. In addition, such a configuration may effectively reduce leaking out traveling noise generated from the tire.

In the preferred embodiment, the inboard center main groove 5 and the outboard center main groove 6, which are arranged near by the tire equator C, may have the respective groove widths GW3 and GW4 which are the largest as compared to those of the other main grooves. Thus drainage performance around the tire equator C of the tread portion 2 may be improved. In this embodiment, the respective groove widths of main grooves satisfy the following relation:

GW2<GW1<GW4=GW3.

Preferably, the respective groove widths of the main grooves 3 to 6 are set in a range of not less than 3%, more preferably not less than 5%, but preferably not more than 10%, more preferably not more than 8% of the tread ground contacting width TW in order to offer optimal drainage performance and steering stability. Preferably, the respective groove depths of the main grooves 3 to 6 are set in a range of not less than 6 mm, more preferably not less than 7 mm.

Here, the tread ground contacting width TW is an axial distance between the inboard tread edges Tei and the outboard tread edge Teo in a standard unloaded condition. The standard unloaded condition is such that the tire 1 is mounted on a standard wheel rim with a standard pressure and is loaded with no tire load. In this application including specification and claims, various dimensions, positions and the like of the tire refer to those under the standard unloaded condition of the tire unless otherwise noted.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA the "Inflation Pressure" in ETRTO, and the maximum pressure given in the "Tire Load Limits at Various Cold Inflation Pressures" table in TRA or the like. In case of passenger car tires, however, the standard pressure is uniformly defined by 180 kPa.

The inboard and outboard tread edges Tei and Teo are defined as axially outer edges in a ground contact patch of the tread portion 2 in the inboard and outboard sides of the tire equator C respectively under a standard loaded condition in which the tire 1 is mounted on the standard wheel rim with the standard pressure and is loaded with a standard tire load at a camber angle of set to zero.

The standard tire load is the "maximum load capacity" in JATMA, the "Load Capacity" in ETRTO, and the maximum value given in the above-mentioned table in TRA or the like. In case of passenger car tires, however, the standard tire load is uniformly defined by 88% of the maximum tire load.

The tread portion 2 is divided into five land portions by the main grooves 3 to 6. The land portions include a center land portion 7 arranged between the inboard center main groove 5 and the outboard center main groove 6, an inboard middle land portion 8 arranged between the inboard center main groove 5 and the inboard shoulder main groove 3, an outboard middle land portion 9 arranged between the outboard center main groove 6 and the outboard shoulder main groove 4, an inboard shoulder land portion 10 arranged axially outward of the inboard shoulder main groove 3 and an outboard shoulder land portion 11 arranged axially outward of the outboard shoulder main groove 4. In this embodiment, these land portions 7 to 11 have substantially same axial widths. For instance, the maximum difference among axial widths of land portions 7 to 11 is preferably within 5 mm.

The tread portion 2 is further provided with a plurality of lateral grooves that extend in a direction to cross the main grooves 3 to 6.

The lateral grooves include a plurality of inboard shoulder lateral grooves 13 that extend axially inward from the inboard tread edge Tei, and a plurality of outboard shoulder lateral grooves 14 that extend axially inward from the outboard tread edge Teo. These inboard shoulder lateral grooves 13 and outboard shoulder lateral grooves 14 may expel axially outwardly the water from under the tread portion 2, thereby improving drainage performance.

The outboard shoulder lateral grooves 14 include a plurality of first outboard shoulder lateral grooves 14a and a plurality of second outboard shoulder lateral grooves 14b.

Each of the first outboard shoulder lateral grooves 14a has an axially inner end 16 positioned between the outboard shoulder main groove 4 and the outboard center main groove 6. In other words, the first outboard shoulder lateral groove 14a extends axially inwardly from the outboard tread edge Teo beyond the outboard shoulder main groove 4 and terminates without reaching the outboard center main groove 6.

Each of the second outboard shoulder lateral grooves 14b has an axially inner end 17 positioned between the outboard shoulder main groove 4 and the outboard tread edge Teo. In other words, each of the second outboard shoulder lateral grooves 14b extends axially inwardly from the outboard tread edge Teo and terminates without reaching the outboard shoulder main groove 4.

In the preferred embodiment, the first outboard shoulder lateral grooves 14a and the second outboard shoulder lateral grooves 14b are arranged alternately in the circumferential direction of the tire. Thus the outboard shoulder land portion 11 can be formed into a plurality of relatively long outboard shoulder blocks 19 each of which is separated by the first board shoulder lateral grooves 14a.

The inboard shoulder lateral grooves 13 include a plurality of first inboard shoulder lateral grooves 13a. Each of the first inboard shoulder lateral grooves 13a has an axially inner end 18 positioned between the inboard shoulder main groove 3 and the inboard center main groove 5. In other words, the first inboard shoulder lateral groove 13a extends axially inwardly from the inboard tread edge Tei beyond the inboard shoulder main groove 3 and terminates without reaching the inboard shoulder center main groove 5. In the inboard shoulder land portion 10, there is not provided with a shoulder groove, which corresponds to the second outboard shoulder lateral groove 14b, that has an axially inner end positioned between the inboard shoulder main groove 3 and the inboard tread edge Tei.

In the pneumatic tire in accordance with the present embodiment, the number of the first inboard shoulder lateral grooves 13a is greater than the number of the first outboard shoulder lateral grooves 14a. In this embodiment, the number of the first inboard shoulder lateral grooves 13a is twice the number of the first outboard shoulder lateral grooves 14a. Accordingly, the inboard shoulder land portion 10 is formed into a plurality of inboard shoulder blocks 20 having circumferential lengths of about a half of those of the outboard shoulder blocks 19.

The tread portion 2 of the pneumatic tire 1 in accordance with the present embodiment may have high pattern rigidity in the side of the outboard tread edge Teo without deteriorating the drainage performance. Thus the pneumatic tire 1 in accordance with the present embodiment may prevent a large deformation of the tread portion 2 even in a cornering condition where the ground contacting center of the tread portion shifts on the outboard tread side. Therefore the tire 1 in accordance with the present embodiment may improve steering stability by offering a large cornering force.

Figure 3:
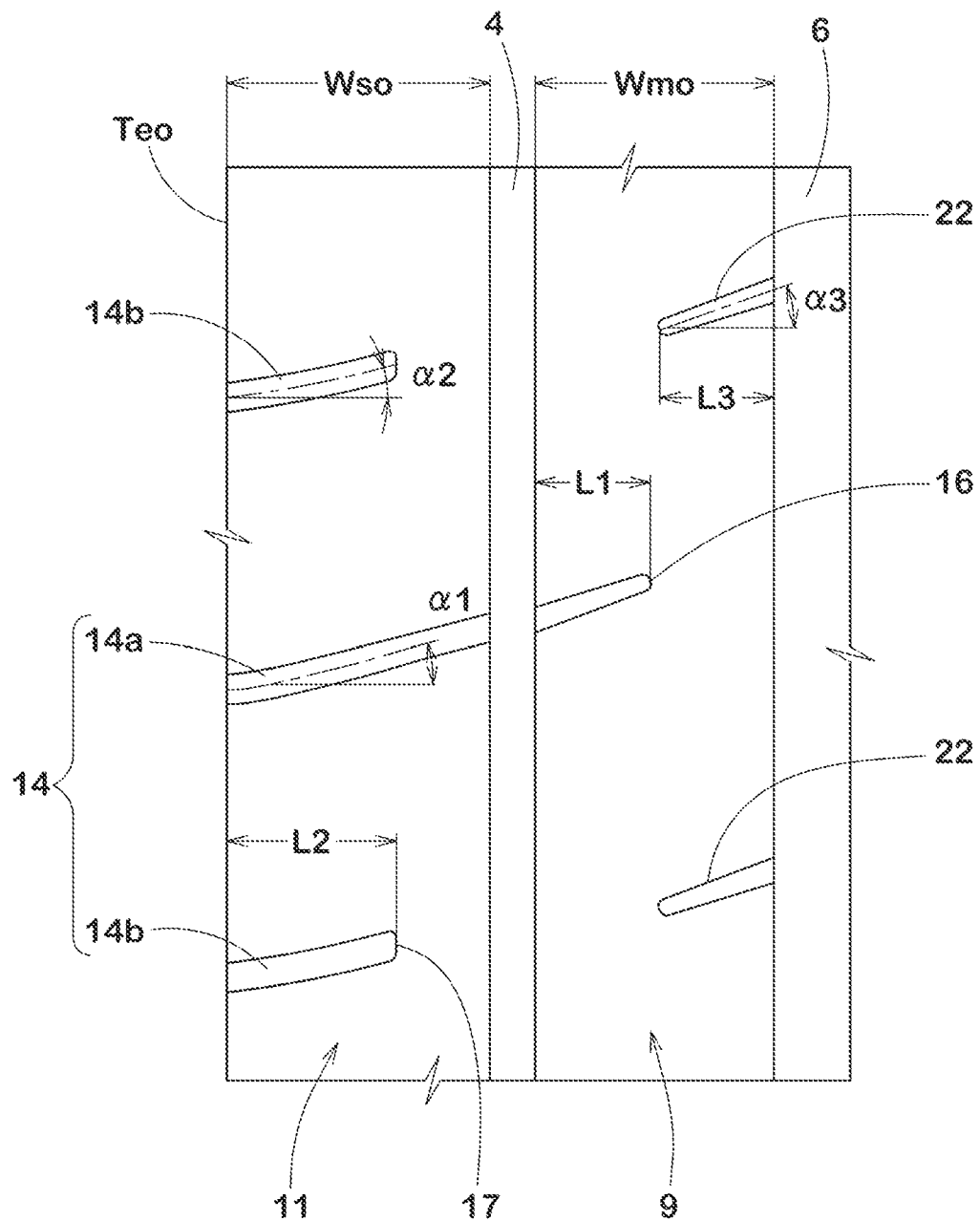
FIG. 3 is an enlarged view of a side of an outboard tread edge of FIG. 1.

FIG. 3 illustrates an enlarged view including a part of the outboard shoulder land portion 11 and the outboard middle land portion 9. As shown in FIG. 3, the first outboard shoulder lateral groove 14a and the second outboard shoulder lateral groove 14b are inclined at angles α1 and α2 respectively with respect to the axial direction of the tire. Preferably, the angles of α1 and α2 are in a range of from 3 to 30 degrees, more preferably in a range of from 5 to 25 degrees in order to reduce tire traveling noise while enhancing rigidity of the outboard shoulder blocks 19.

The first outboard shoulder lateral groove 14a has an axial length L1 measured on the outboard middle land portion 9 which is less than 100% of the axial width Wmo of the outboard middle land portion 9. Preferably, the length L1 of the outboard shoulder lateral groove 14a on the outboard middle land portion 9 is set in a range of from 40% to 60% of the axial width Wmo in order to offer high pattern rigidity and excellent drainage performance on the outboard middle land portion 9.

The second outboard shoulder lateral groove 14b has an axial length L2 measured on the outboard shoulder land portion 11 which is less than the axial width Wso of the outboard shoulder land portion 11. Preferably, the length L2 of the second outboard shoulder lateral groove 14b is set in a range of from 40% to 60% of the axial width Wso of the outboard shoulder land portion 11 in order to offer high pattern rigidity and excellent drainage performance on the outboard middle land portion 9.

In the preferred embodiment of the invention, the outboard middle land portion 9 is provided with a plurality of outboard middle lug grooves 22 as shown in FIG. 3.

Each of the outboard middle lug grooves 22 is arranged in between circumferentially adjacent first outboard shoulder lateral grooves 14a. Thus the outboard middle lug grooves 22 and the first outboard shoulder lateral grooves 14a are arranged alternately in the circumferential direction of the tire on the outboard middle land portion 9. In the preferred embodiment, each of the outboard middle lug grooves 22 is arranged on each virtual extension V1 (shown in FIG. 1) in which each of the second outboard shoulder lateral grooves 14b is smoothly extended axially inwardly. Such a groove arrangement configuration may further improve steering stability.

Each of the outboard middle lug grooves 22 extends axially outwardly from the outboard center main groove 6 without reaching the outboard shoulder main groove 4. Thus the outboard middle land portion 9 can be formed into a rib that continuously extends in the circumferential direction of the tire.

In the preferred embodiment, each of the outboard middle lug grooves 22 are inclined in the same direction of the outboard shoulder lateral grooves 14. More preferably, each of the outboard middle lug grooves 22 has an angle α3 with respect to the axial direction of the tire, and the angle α3 is substantially same as the angles α1 and α2 of the outboard shoulder lateral grooves 14.

The outboard middle lug groove 22 has an axial groove length L3 in a range of from 40% to 60% of the axial width Wmo of the outboard middle land portion 9 in order to offer high pattern rigidity and drainage performance on the outboard middle land portion 9. In this embodiment, the sum of the axial lengths L1 and L3 of the outboard middle lug groove 22 and the first outboard shoulder lateral groove 14a is substantially same as the axial width Wmo of the outboard middle land portion 9.

Figure 4:
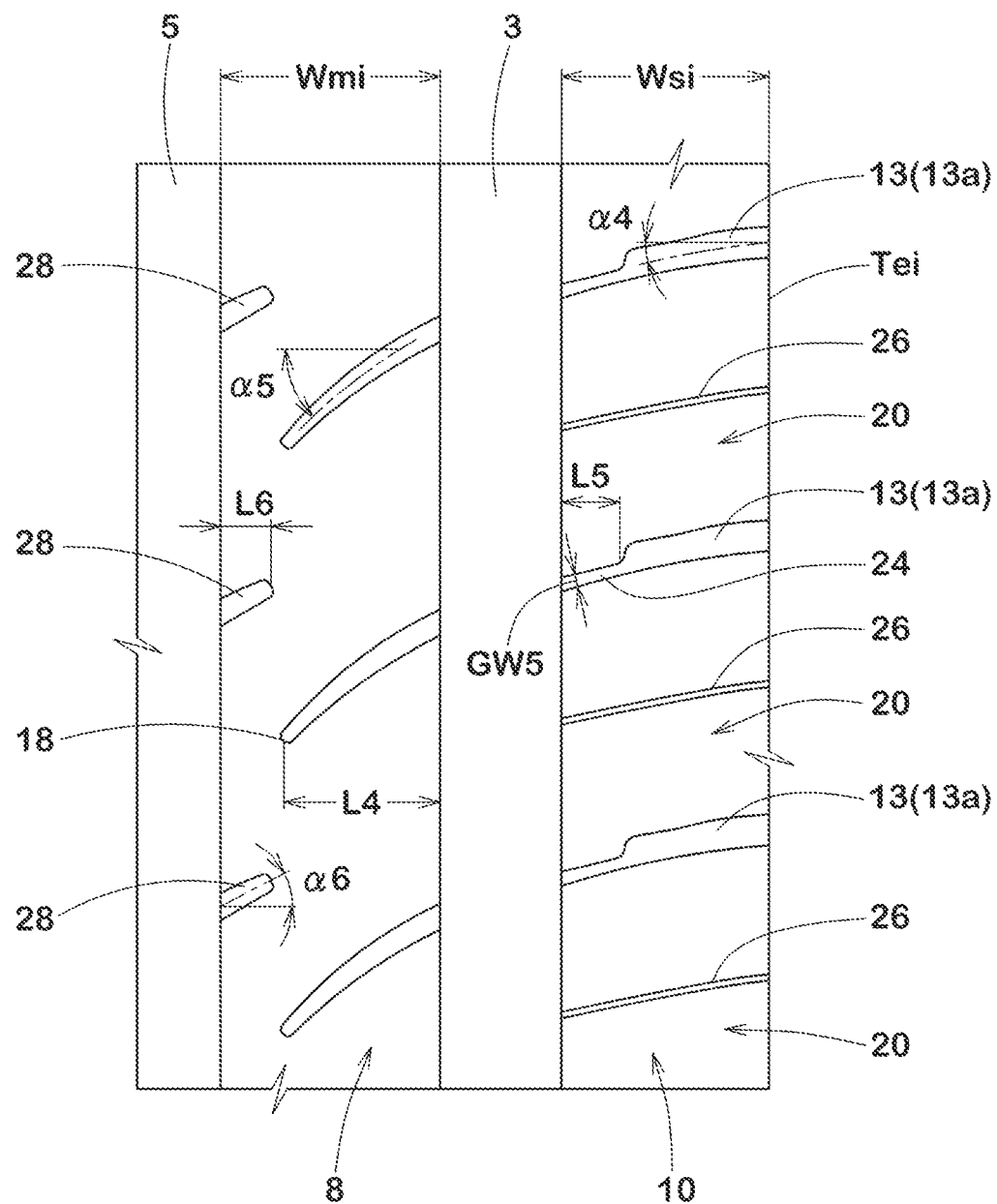
FIG. 4 is an enlarged view of a side of inboard tread edge of FIG. 1.

FIG. 4 illustrates an enlarged view of the inboard shoulder land portion 10 and the inboard middle land portion 8. As shown in FIG. 4, each of the first inboard shoulder lateral grooves 13a is inclined with respect to the axial direction of the tire. In this embodiment, the respective first inboard shoulder lateral grooves 13a are inclined in a direction same as the respective outboard shoulder lateral grooves 14.

Each of the first inboard shoulder lateral grooves 13a extends in a substantially arc shape from the inboard tread edge Tei to its axially inner end 18. Furthermore, each of the first inboard shoulder lateral grooves 13a has an angle of α4 on the inboard shoulder land portion 10 and an angle of α5 on the inboard middle land portion 8, wherein the angle α1 is smaller than the angle α5. Such a groove configuration may offer high lateral rigidity on the inboard shoulder block 20 while offering excellent drainage performance on the inboard middle land portion 8. Preferably, the angles α1 and α5 are in a range of from 3 to 30 degrees, more preferably in a range of from 5 to 25 degrees.

Each of the first inboard shoulder lateral grooves 13a has an axial length L4 on the inboard middle land portion 8 which is less than the axial width Wmi of the inboard middle land portion 8. Preferably, the length L4 of the first inboard shoulder lateral groove 13a is in a range of from 40% to 60% of the axial width Wmi of the inboard middle land portion 8 in order to offer high pattern rigidity and excellent drainage performance on the inboard middle land portion 8. More preferably, the length L4 of the first inboard shoulder lateral groove 13a is set larger than the length L1 of the first outboard shoulder lateral groove 14a in order to further improve drainage performance and steering stability.

The first inboard shoulder lateral groove 13a has a neck portion 24 that has a locally narrowed width on the inboard shoulder land portion 10. The neck portion 24 may come into contact with its groove walls one another when a large circumferentially shearing force acts on the inboard shoulder block 20, thereby reducing deformation on the inboard shoulder blocks 20. Thus uneven wear such as a heel and toe wear may be prevented from generating on the inboard shoulder blocks 20. Preferably, the neck portion 24 has a groove width GW5 in a range of from 2 to 4 mm in order to further improving the advantage described above while ensuring excellent drainage performance.

Preferably, the neck portion 24 is arranged on a certain position of the inboard shoulder land portion 10 on which a relatively large ground contacting pressure acts. For instance, the neck portion 24 in accordance with the embodiment is arranged so as to have an axial length L5 from the inboard shoulder main groove 3. Preferably, the axial length L5 of the neck portion 24 is in a range of from 5% to 30% of the axial width Wsi of the inboard shoulder land portion 10 in order to prevent uneven wear on the inboard shoulder blocks 20 while ensuring drainage performance.

Preferably, each of the inboard shoulder blocks 20 is provided with an inboard shoulder sipe 26 which is arranged in a circumferential center portion of the inboard shoulder block 20. Preferably, the axially both ends of the inboard shoulder sipe 26 open at axially each side of the inboard shoulder block 20. In this embodiment, the sipe has a width not more than 1.5 mm, and the sipe is distinguished from a groove having a groove width in a range of more 1.5 mm. The inboard shoulder sipes 26 may improve uneven wear resistance on the inboard shoulder blocks 20 by reducing rigidity.

In the more preferred embodiment, the inboard middle land portion 8 is provided with a plurality of inboard middle lug grooves 28 as shown in FIGS. 1 and 4.

Each of the inboard middle lug grooves 28 is arranged between the circumferentially adjacent first inboard shoulder lateral grooves 13a and 13a. Thus the inboard middle lug grooves 28 and the first inboard shoulder lateral grooves 13a are alternately arranged in the circumferential direction of the tire on the inboard middle land portion 8.

Each of the inboard middle lug grooves 28 extends axially outwardly from the inboard center main groove 5 without reaching the inboard shoulder main groove 3. In the preferred embodiment, each of the inboard middle lug grooves 28 is inclined in the same direction as the outboard shoulder lateral grooves 14 and the inboard shoulder lateral grooves 13. The angle $\alpha 5$ of the inboard middle lug groove 28 with respect to the axial direction of the tire is preferably in a range of from 5 to 30 degrees. More preferably, the angle $\alpha 6$ is set larger than the angle $\alpha 3$ of the outboard middle lug groove 22. Thus drainage performance on the inboard middle land portion 8 may further be improved.

Preferably, the axial length L6 of the inboard middle lug groove 28 is in a range of from 5% to 30% of the axial width Wmi of the inboard middle land portion 8 in order to offer high rigidity and optimal drainage performance on the inboard middle land portion 8. In this embodiment, the sum (L6+L4) of the length of the inboard middle lug groove 28 and the first inboard shoulder lateral groove 13a is substantially same as the axial width Wmi of the inboard middle land portion 8.

As shown in FIGS. 1 and 2, the center land portion 7 is provided with a plurality of center lateral grooves 29.

Each of the center lateral grooves 29 extends so as to communicate the inboard center main groove 5 with the outboard center main groove 6. In this embodiment, the number of center lateral grooves 29 is the same as the number of the first outboard shoulder lateral grooves 14a. Thus the center land portion 7 is formed into a plurality of relatively long shape center blocks 30.

In this embodiment, the center lateral grooves 29 are inclined in the same direction as the outboard shoulder lateral grooves 14 and the inboard shoulder lateral grooves 13. In the preferred embodiment, an angle $\alpha 7$ of the center lateral groove 29 with respect to the axial direction of the tire is preferably in a range of from 5 to 30 degrees. In the preferred embodiment, the angle $\alpha 7$ is substantially same as the angle $\alpha 1$ of the first outboard shoulder lateral groove 14a. In the more preferred embodiment, each of the center lateral grooves 29 is arranged in a virtual extension V2 (shown in FIG. 1) in which each of the first outboard shoulder lateral grooves 14a is smoothly extended axially inwardly. Such a groove arrangement configuration may further improve steering stability.

Preferably, the center lateral grooves 29 has a groove width smaller than that of the first outboard shoulder lateral groove 14a. Thus the adjacent center blocks 30 and 30 may come into contact to support one another when large circumferentially shearing force acts on the center land portion 7, thereby reducing deformation on the respective center blocks 30. Accordingly, the pneumatic tire 1 in accordance with the present embodiment may offer a large traction and braking force and high uneven wear resistance. In order to further improve the advantages above, the center lateral grooves 29 preferably have a groove width in a range of from 2 to 5 mm.

As shown in FIG. 2, the groove depth of the center lateral groove 29 is preferably smaller than the groove depth of the outboard shoulder lateral groove 14. In this embodiment, the shoulder lateral grooves 13 and 14 have the same groove depth as the groove depth of the main grooves 3 to 6. Preferably, each of the center lateral grooves 29 has a groove depth in a range of not more than 50%, more preferably in a range of from 30% to 50% of the groove depth of the main grooves 3 to 6 in order to further improve the advantageous effect described above.

In this embodiment, the center land portion the inboard middle land portion 8 and the outboard middle land portion 9 of the tread portion 2 have substantially same rigidity due to these substantially same axial widths and a groove arrangement of the respective outboard middle lug groove 22 and inboard middle lug grooves 28. Thus the tire 1 in accordance with the present embodiment may offer a stable and smooth behavior at a transitional condition where a vehicle turns a corner from straight traveling.

While the particularly preferable embodiments of the present invention have been described in detail, the present invention is not limited to the illustrated embodiments, but can be modified and carried out in various aspects.

Comparison Test

In order to confirm the advantageous effect of the invention, passenger car tires having a size of 225/55R18 were prototyped based on Table 1 and tested.

Figure 5:
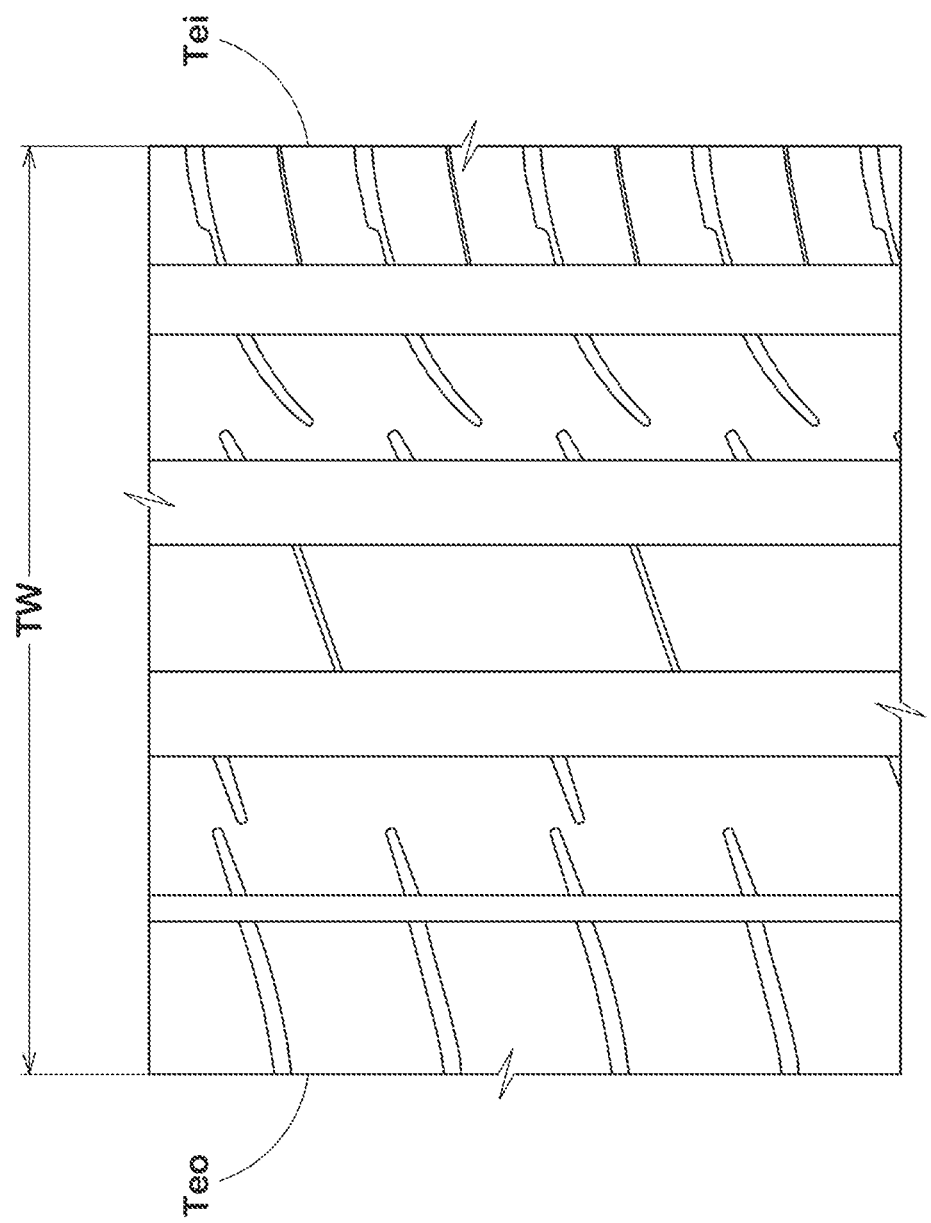
FIG. 5 is a development view of a tread portion of a pneumatic tire ire accordance with a reference tire.
Figure 6:
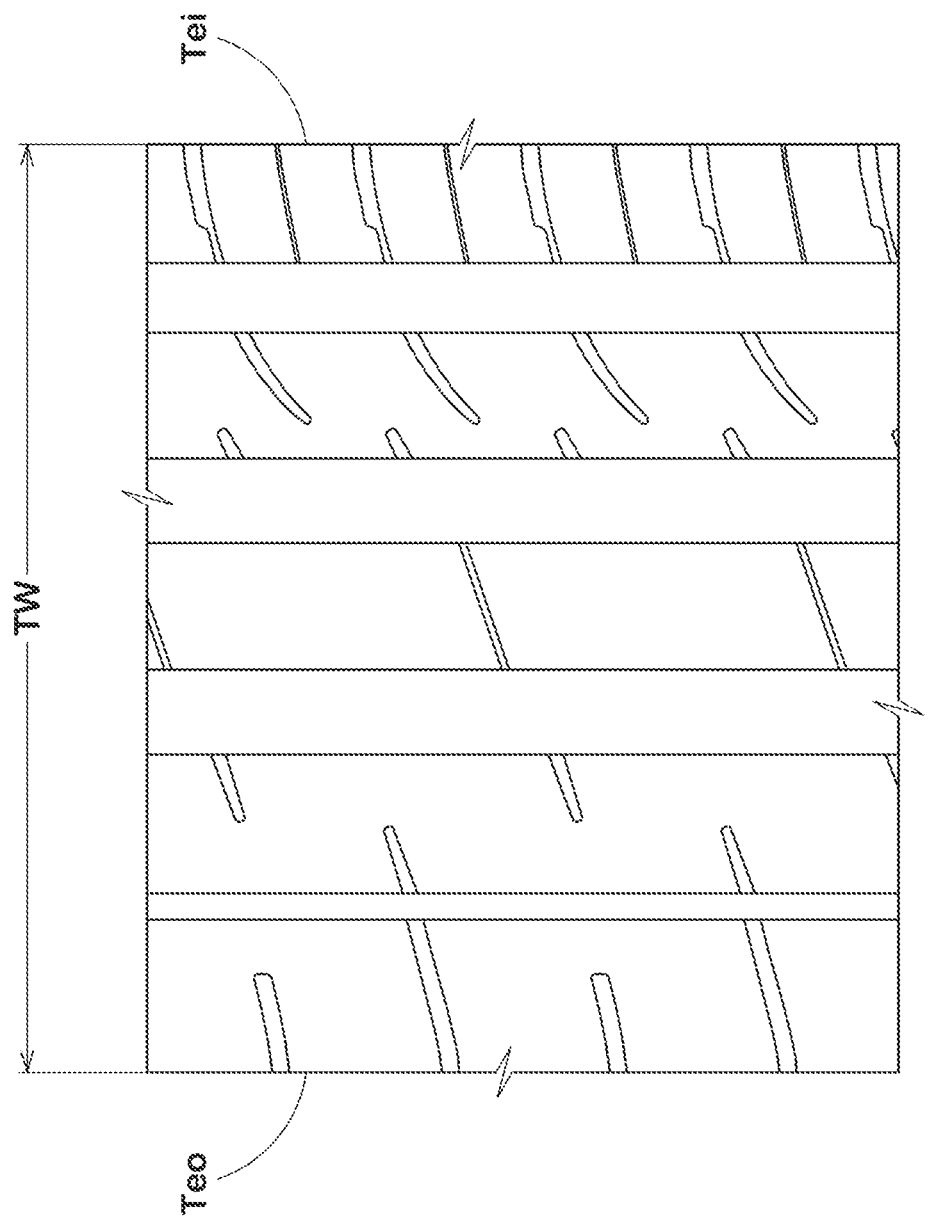
FIG. 6 is a development view of a tread portion of a pneumatic tire in accordance with an example 2.

The tire of Ex. 1 includes the tread pattern shown in FIG. 1. The tire of Ex. 2 includes the tread pattern shown in FIG. 6. The tire of Ex. 2 includes the center lateral grooves circumferentially shifted in a half pitch with respect to those of the tread pattern of FIG. 1. The tire of Ref. 1 includes the tread pattern shown in FIG. 5. As shown in FIG. 5, the Ref. 1 includes outboard shoulder lateral grooves each of which extends axially inwardly beyond the outboard shoulder main groove so that the number of the first inboard shoulder lateral grooves equals to the number of first outboard shoulder lateral grooves.

Test procedures are as follows.

Steering Stability Test:

The test tires were installed to a vehicle (Japanese passenger car with a displacement of 2,500 cc) with an internal pressure of 230 kPa, and then a professional test driver drove the vehicle on dry asphalt road to evaluate steering stability such as the steering response during cornering, stiffness and cornering grip. The results are indicated in Table 1 by a score based on Ref. 1 being 100, wherein the larger the value, the better the performance is.

Pass-by Noise Test:

According to the "Test Procedure for Tire Noise" specified in Japanese JASO-C606, a test car provided with test tires was coasted for 50 meters at a speed of 60 km/h in a straight test asphalt course and the maximum noise sound level was measured with a microphone set at 1.2 meter height from the road surface and 7.5 meter sideways from the running center line. The results are indicated in Table 1 by an index based on Ref. 1 being 100, wherein the smaller the value, the better the performance is.

Table 1 shows the test results.

TABLE 1

|  | Ref. 1 | Ex. 1 | Ex. 2 |
| --- | --- | --- | --- |
| Steering stability test (Score) | 100 | 130 | 120 |
| Pass-by noise (Index) | 100 | 105 | 105 |

From the test results, it was confirmed that the tires in accordance with the present invention improved pass-by noise and steering stability as compared to the reference tire.

What is claimed is:

1. A pneumatic tire comprising:
a tread portion having a designated installation direction to a vehicle, the tread portion provided with an inboard tread edge, an outboard tread edge, a plurality of circumferentially and continuously extending main grooves so as to form a plurality of land portions between the inboard tread edge and the outboard tread edge and a plurality of lateral grooves;
the main grooves comprising an inboard shoulder main groove arranged proximate to the inboard tread edge, an outboard shoulder main groove arranged proximate to the outboard tread edge, an inboard center main groove arranged between the inboard shoulder main groove and a tire equator and an outboard center main groove arranged between the outboard shoulder main groove and the tire equator;
the lateral grooves comprising a plurality of inboard shoulder lateral grooves extending axially inward from the inboard tread edge and a plurality of outboard shoulder lateral grooves extending axially inward from the outboard tread edge;
the outboard shoulder lateral grooves comprising a plurality of first outboard shoulder lateral grooves each having an axially inner end positioned between the outboard shoulder main groove and the outboard center main groove in such a manner that the axially inner end is not in communication with the outboard center main groove, and a plurality of second outboard shoulder lateral grooves each having an axially inner end positioned between the outboard shoulder main groove and the outboard tread edge; and
the inboard shoulder lateral grooves comprising a plurality of first inboard shoulder lateral grooves each having an axially inner end positioned between the inboard shoulder main groove and the inboard center main groove, wherein the number of the first inboard shoulder lateral grooves is greater than the number of the first outboard shoulder lateral grooves.

2. The pneumatic tire according to claim 1, wherein the number of first inboard shoulder lateral grooves is twice the number of first outboard shoulder lateral grooves.

3. The pneumatic tire according to claim 1, wherein the first outboard shoulder lateral grooves and the second outboard shoulder lateral grooves are alternately arranged in a circumferential direction of the tire.

4. The pneumatic tire according to claim 1, wherein the first outboard shoulder lateral grooves extend in parallel to the second outboard shoulder lateral grooves.

5. The pneumatic tire according to claim 1, wherein the outboard shoulder main groove has a minimum groove width among the main grooves.

6. The pneumatic tire according to claim 1, wherein a plurality of center lateral grooves extending between the inboard center main groove and the outboard center main groove are arranged.

7. The pneumatic tire according to claim 6, wherein each of the center lateral grooves has a groove depth in a range of not more than 50% of a groove depth of the inboard center main groove.

8. The pneumatic tire according to claim 6, wherein the number of the center lateral groove is the same as the number of the first outboard shoulder lateral groove.

9. The pneumatic tire according to claim 1, wherein an inboard middle lug groove extending axially outward from the inboard center main groove without reaching the inboard shoulder main groove is arranged between the circumferentially adjacent first inboard shoulder lateral grooves.

10. The pneumatic tire according to claim 1, wherein an outboard middle lug groove extending axially outward from the outboard center main groove without reaching the outboard shoulder main groove is arranged between the circumferentially adjacent first outboard shoulder lateral grooves.

11. A pneumatic tire comprising:
a tread portion having a designated installation direction to a vehicle, the tread portion provided with an inboard tread edge, an outboard tread edge, a plurality of circumferentially and continuously extending main grooves so as to form a plurality of land portions between the inboard tread edge and the outboard tread edge and a plurality of lateral groves;
the main grooves comprising an inboard shoulder main groove arranged proximate to the inboard tread edge, an outboard shoulder main groove arranged proximate to the outboard tread edge, an inboard center main groove arranged between the inboard shoulder main groove and a tire equator and an outboard center main groove arranged between the outboard shoulder main groove and the tire equator;
the lateral grooves comprising a plurality of inboard shoulder lateral grooves extending axially inward from the inboard tread edge and a plurality of outboard shoulder lateral grooves extending axially inward from the outboard tread edge;
the outboard shoulder lateral grooves comprising a plurality of first outboard shoulder lateral grooves each having an axially inner end positioned between the outboard shoulder main groove and the outboard center main groove, and a plurality of second outboard shoulder lateral grooves each having an axially inner end positioned between the outboard shoulder main groove and the outboard tread edge; and
the inboard shoulder lateral grooves comprising a plurality of first inboard shoulder lateral grooves each having an axially inner end positioned between the inboard shoulder main groove and the inboard center main groove in such a manner that the axially inner end is not in communication with the inboard center main groove, wherein the number of the first inboard shoulder lateral grooves is greater than the number of the first outboard shoulder lateral grooves.

12. The pneumatic tire according to claim 11, wherein the number of first inboard shoulder lateral grooves is twice the number of first outboard shoulder lateral grooves.

13. The pneumatic tire according to claim 11, wherein the first outboard shoulder lateral grooves and the second outboard shoulder lateral grooves are alternately arranged in a circumferential direction of the tire.

14. The pneumatic tire according to claim 11, wherein the first outboard shoulder lateral grooves extend in a parallel to the second outboard shoulder lateral grooves.

15. The pneumatic tire according to claim 11, wherein the outboard shoulder main groove has a minimize groove width among the main grooves.

16. The pneumatic tire according to claim 11, wherein a plurality of center lateral grooves extending between the inboard center main groove and the outboard center main groove are arranged.

17. The pneumatic tire according to claim 16, wherein each of the center lateral grooves has a groove depth in a range of not more than 50% of a groove depth of the inboard center main groove.

18. The pneumatic tire according to claim 16, wherein the number of the center lateral groove is the same as the number of the first outboard shoulder lateral groove.

19. The pneumatic tire according to claim 11, wherein an inboard middle lug groove extending axially outward from the inboard center main groove without reaching the inboard shoulder main groove is arranged between the circumferentially adjacent first inboard shoulder lateral grooves.

20. The pneumatic tire according to claim 11, wherein an outboard middle lug groove extending axially outward from the outboard center main groove without reaching the outboard shoulder main groove is arranged between the circumferentially adjacent first outboard shoulder lateral grooves.

* * * * *